(12) United States Patent
Cai et al.

(10) Patent No.: US 8,650,094 B2
(45) Date of Patent: Feb. 11, 2014

(54) MUSIC RECOMMENDATION USING EMOTIONAL ALLOCATION MODELING

(75) Inventors: Rui Cai, Beijing (CN); Lei Zhang, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1425 days.

(21) Appl. No.: 12/116,855

(22) Filed: May 7, 2008

(65) Prior Publication Data

US 2009/0281906 A1    Nov. 12, 2009

(51) Int. Cl.
 *G06Q 30/00*        (2012.01)

(52) U.S. Cl.
 USPC ........................................................ 705/26.7

(58) Field of Classification Search
 USPC ................ 705/26.1, 26.2, 26.25, 26.3, 26.35,
  705/26.4, 26.41–26.44, 26.5, 26.61–26.64,
  705/26.7, 26.8, 26.81, 26.82, 26.9, 27.1,
  705/27.2
 See application file for complete search history.

(56) References Cited

U.S. PATENT DOCUMENTS

| | | | |
|---|---|---|---|
| 5,918,223 A | 6/1999 | Blum et al. | |
| 6,041,311 A | 3/2000 | Chislenko et al. | |
| 6,370,513 B1 | 4/2002 | Kolawa et al. | |
| 6,452,083 B2 | 9/2002 | Pachet et al. | |
| 6,504,089 B1 | 1/2003 | Negishi et al. | |
| 6,539,395 B1 * | 3/2003 | Gjerdingen et al. | 1/1 |
| 6,684,249 B1 | 1/2004 | Frerichs et al. | |
| 6,993,532 B1 | 1/2006 | Platt et al. | |
| 7,065,416 B2 | 6/2006 | Weare et al. | |
| 7,312,391 B2 | 12/2007 | Kaiser et al. | |
| 7,379,875 B2 | 5/2008 | Burges et al. | |
| 7,532,943 B2 | 5/2009 | Weare | |
| 7,548,934 B1 | 6/2009 | Platt et al. | |
| 8,442,849 B2 * | 5/2013 | Kantak et al. | 705/7.11 |
| 2002/0002899 A1 * | 1/2002 | Gjerdingen et al. | 84/667 |
| 2002/0181711 A1 | 12/2002 | Logan et al. | |
| 2003/0177110 A1 * | 9/2003 | Okamoto et al. | 707/3 |
| 2005/0038819 A1 | 2/2005 | Hicken et al. | |
| 2006/0047580 A1 | 3/2006 | Saha | |
| 2006/0254411 A1 | 11/2006 | Alcalde et al. | |
| 2006/0259355 A1 | 11/2006 | Farouki et al. | |
| 2007/0078708 A1 | 4/2007 | Yu et al. | |

(Continued)

FOREIGN PATENT DOCUMENTS

| | | | | |
|---|---|---|---|---|
| JP | 2006-155157 | * | 6/2006 | ............ G06F 17/30 |
| JP | 2006-178104 | * | 7/2006 | ............ G10H 1/00 |

OTHER PUBLICATIONS

Croft et al., "Relevance Feedback and Personalization: A Language Modeling Perspective", DELOS Workshop Personalisation and Recommender Systems in Digital Libraries (2001).*

(Continued)

*Primary Examiner* — Naeem Haq
(74) *Attorney, Agent, or Firm* — Carole Boelitz; Micky Minhas (57) ABSTRACT

An exemplary method includes defining a vocabulary for emotions; extracting descriptions for songs; generating distributions for the songs in an emotion space based at least in part on the vocabulary and the extracted descriptions; extracting salient words from a document; generating a distribution for the document in an emotion space based at least in part on the vocabulary and the extracted salient words; and matching the distribution for the document to one or more of the distributions for the songs. Various other exemplary methods, devices, systems, etc., are also disclosed.

20 Claims, 9 Drawing Sheets

EXEMPLARY METHOD 100

(56) References Cited

U.S. PATENT DOCUMENTS

| | | | |
|---|---|---|---|
| 2007/0078709 A1 | 4/2007 | Rajaram | |
| 2007/0112630 A1 | 5/2007 | Lau et al. | |
| 2007/0143778 A1 | 6/2007 | Covell et al. | |
| 2007/0157795 A1* | 7/2007 | Hung | 84/600 |
| 2008/0091515 A1* | 4/2008 | Thieberger et al. | 705/10 |
| 2009/0222398 A1* | 9/2009 | Allen et al. | 706/52 |
| 2009/0265170 A1* | 10/2009 | Irie et al. | 704/236 |
| 2009/0277322 A1 | 11/2009 | Cai et al. | |
| 2009/0316862 A1* | 12/2009 | Sugimoto et al. | 379/88.01 |
| 2011/0004642 A1* | 1/2011 | Schnitzer | 707/912 |
| 2011/0223571 A1* | 9/2011 | Farahat et al. | 434/236 |
| 2011/0225043 A1* | 9/2011 | Bhatia et al. | 705/14.53 |
| 2011/0225049 A1* | 9/2011 | Bhatia et al. | 705/14.66 |
| 2011/0252947 A1* | 10/2011 | Eggink et al. | 84/609 |
| 2012/0158504 A1* | 6/2012 | Kumar et al. | 705/14.53 |

OTHER PUBLICATIONS

Douglas Turnbull et al., "Semantic Annotation and Retrieval of Music and Sound Effects", IEEE Transactions on Audio, Speech, and Language Processing, vol. 16, No. 2, Feb. 2008.*

Luke Barrington et al., "Semantic Similarity for Music Retrieval", 2007 Austrian Computer Society (OCG).*

Douglas Turnbull et al., "Towards Musical Query-by-Semantic-Description using the CAL500 Data Set", SIGIR'07, Jul. 23-27, 2007, Amsterdam, The Netherlands. Copyright 2007 ACM 978-1-59593-597-7-07-0007.*

Harb et al., "A Query by Example Music Retrieval Algorithm", Digital Media Processing for Multimedia Interactive Services, Proceedings of the 4th European Workshop on Image Analysis for Multimedia Interactive Services, 2003, ISBN 981-238-355-7.*

Cai, et al., "MusicSense: Contextual Music Recommendation Using Emotional Allocation Modeling", MultiMedia 2007, Sep. 23-28, 2007 Augsburg, Bavaria, Germany, Copyright 2007.

Cai, et al., "Scalable Music Recommendation by Search", MultiMedia 2007, Sep. 23-28, 2007 Augsburg, Bavaria, Germany, Copyright 2007.

Knees, et al., "A Music Search Engine Built upon Audio-based and Web-based Similarity Measures", at <<http://www.cp.jku.at/research/papers/Knees_etal_sigir_2007.pdf>>, ACM, 2007, pp. 8.

Knees, et al., "Combining Audio-based Similarity with Web-based Data to Accelerate Automatic Music Playlist Generation", at <<http://www.cp.jku.at/research/papers/Knees_etal_MIR_2006.pdf>>, ACM, 2006, pp. 7.

Leshed, et al., "Understanding How Bloggers Feel: Recognizing Affect in Blog Posts", at <<http://alumni.media.mit.edu/~jofish/writing/recognizing-bloggers-affect.pdf>>, Montreal, 2006, pp. 6.

Lu, et al., "Automatic Mood Detection and Tracking of Music Audio Signals", at <<http://ieeexplore.ieee.org/Xplore/login.jsp?url=/iel5/10376/33144/01561259.pdf&arnumber=1561259>>, IEEE, vol. 14, No. 1, Jan. 2006, pp. 5-18.

Paiva, "Content-Based Classification and Retrieval of Music: Overview and Research Trends", available at least as early as Nov. 14, 2007, at <<http://cisuc.dei.uc.pt/dlfile.php?fn=1124_pub_TR_(State-of-the-Art).pdf&get=1&idp=1124&ext=>>, pp. 26.

Yoshii, et al., "Hybrid Collaborative and Content-Based Music Recommendation Using Probabilistic Model with Latent User Preferences", at <<http://winnie.kuis.kyoto-u.ac.jp/~okuno/paper/ISMIR0647-Yoshii.pdf>>, University of Victoria, 2006, pp. 6.

Monrovia, "Soundflavor Licensees MusicIP Acoustic Fingerprint Service", retrieved at <<http://www.musicip.com/PressReleases/Soundflavor_and_MusicIP_Partnership_Press_Release.pdf>>, Music IP, Nov. 2006, 2 pgs.

Office Action for U.S. Appl. No. 12/116,805, mailed on May 12, 2011, Rui Cai, "Scalable Music Recommendation by Searching", 7 pgs.

Shahabi, et al., "Yoda: An Accurate and Scalable Web-based Recommendation System", retrieved at <<http://infolab.usc.edu/DocsDemos/COOPIS2001.pdf>>, Proc Sixth Intl Conf on Cooperative Information Systems, Sep. 2001, 14 pgs.

"SoundsLike", retrieved Nov. 15, 2007 at <<http://www.idmt.fraunhofer.de/eng/research_topics/soundslike.htm>>, Fraunhofer IDMIT, Fraunhofer IDMIT Research Topics, 2005, 1 pgs.

Yang, "MACS: Music Audio Characteristic Sequence Indexing for Similarity Retrieval", In the Proceedings of the IEEE Workshop on the Applications of Signal Processing to Audio and Acoustics, Oct. 2001, pp. 123-126.

"ZuKool Music: Personalized Music Recommendations", retrieved Nov. 15, 2007 at <<http://www.zukool.com/>>, ZuKool Inc., 2007, 3 pgs.

Office Action for U.S. Appl. No. 13/363,241, mailed on May 24, 2012, Cai et al., "Scalable Music Recommendation by Search", 10 pages.

\* cited by examiner

EXEMPLARY MODEL 400

FIG. 4

TABLE 1: EXEMPLARY STEPS 500
FOR VARIATIONAL INFERENCE OF THE PARAMETERS OF THE MODEL 400

1. $\lambda_i^* = N/K$, $(1 \leq i \leq K)$.
2. for $n = 1$ to $N$ do
3.     for $i = 1$ to $K$ do $\phi_{ni} = \beta_{iw_n} \exp(\Psi(\lambda_i^*))$, $^a$ end.
4.     *normalize* the sum of $\phi_{ni}$, $1 \leq i \leq K$, to 1.
5. end.
6. for $i = 1$ to $K$ do $\lambda_i^* = \varepsilon + \sum_{n=1}^{N} \phi_{ni}$, $^b$ end.
7. if convergence *exit*; else *goto* line 2.

$^a\Psi(x)$ is the first derivative of the $\log \Gamma(x)$, and can be approximated via Taylor expansion.
$^b\varepsilon$ is a small positive constant for parameter smoothing.

MUSIC RECOMMENDATION USING EMOTIONAL ALLOCATION MODELING

BACKGROUND

The growth of music resources on personal devices and Internet radio has altered the channels for music sales and increased the need for music recommendations. For example, store-based and mail-based CD sales are dropping while music portals for electronic distribution of music (bundled or unbundled) like iTunes, MSN Music, and Amazon are increasing.

To further increase music sales, techniques to generate recommendations are now being used to help consumers find more interesting songs. Many commercial systems such as Amazon.com, Last.fm (http://www.last.fm), and Pandora (http://www.pandora.com) have developed particular approaches for music recommendation. For example, Amazon.com and Last.fm adopt collaborative filtering (CF)-based technologies to generate recommendations. For example, if two users have similar preferences for some music songs, then these techniques assume that these two users tend to have similar preferences for other songs (e.g., song that they may not already own or are aware of). In practice, such user preference is discovered through mining user buying histories. Some other companies such as Pandora utilize content-based technologies for music recommendations. This technique recommends songs with similar acoustic characteristics or meta-information (like composer, theme, style . . . ).

Although the aforementioned techniques have shown some degree of effectiveness in practice, however, most conventional techniques for generating music recommendations operate in a passive mode. For example, such passive techniques require consumers to first log on some portal sites and then take some actions to get suggestions. In other words, these recommendation services are passive and need to be triggered by users.

As described herein, various exemplary methods, devices, systems, etc., generate music recommendations and optionally buying options for consumers. Various exemplary techniques operate actively to enhance user experience, especially when applied to Web browsing.

SUMMARY

An exemplary method includes defining a vocabulary for emotions; extracting descriptions for songs; generating distributions for the songs in an emotion space based at least in part on the vocabulary and the extracted descriptions; extracting salient words from a document; generating a distribution for the document in an emotion space based at least in part on the vocabulary and the extracted salient words; and matching the distribution for the document to one or more of the distributions for the songs. Various other exemplary methods, devices, systems, etc., are also disclosed.

DESCRIPTION OF DRAWINGS

Non-limiting and non-exhaustive examples are described with reference to the following figures.

DETAILED DESCRIPTION

Various exemplary methods, devices, systems, etc., generate music recommendations based at least in part on information that describes emotion. In the field of psychology, so-called "coding systems" associate terms with human behavioral states. For example, a coding system may associate the word "happy" with a behavioral state that exhibits smiling and laughter. As described herein, the word "happy" would be an example of information that describes emotion.

An exemplary technique relies on probabilistic modeling (referred to at times as "emotional allocation") to characterize songs and Web pages as distributions in a common emotion space. This modeling approach leverages both the statistics from a large-scale Web corpus and guidance from psychological studies. This approach can also maintain the inference ability of generative models.

An exemplary technique for relevance matching includes representing songs and Web documents by a collection of word terms, based on which corresponding emotion distribution parameters are optimized. In various examples, the optimization occurs in an iterative manner. This technique then compares distributions, based on the parameters, using Kullback-Leibler (KL) divergence. In turn, the closest document-song pairs can be selected and used, directly or indirectly, to recommend music. Alternatively, a reverse approach may recommend documents for music.

As discussed in more detail below, an exemplary modeling approach assumes that given a language and its vocabulary, different emotions should have different distributions over the terms in this vocabulary. In other words, the frequencies of a term under different emotions are also different. Hence, given a collection of terms (e.g. a document), the approach makes the supposition that the collection is generated by sampling a mixture of various emotions, as terms in this collection can be considered as controlled by different emotions. The parameters of such a sampling can be computed in a maximum likelihood manner. In such a way, a term collection can have a certain allocation of emotions, in form of a probability distribution. Consequently, this modeling approach is referred to as "emotional allocation".

Emotional allocation modeling also refers to knowledge of psychology, to get a relatively complete and well-structured emotion vocabulary (i.e., coding system). To achieve more accurate model estimation, learning can be performed for term-emotion relations through analysis of a very large-scale of documents (e.g., Web pages); noting that other techniques for selecting a training set may be used.

In various examples, an exemplary approach adopts Web-based information to describe music songs, as current content-based music analysis technologies are quite limited in handling classifications on the order of tens of moods. As described herein, it is recognized that, on the Web, there exists a relatively abundant amount of information such as lyrics and reviews to describe the semantic of a song. Thus, an exemplary approach can use search engines to retrieve more information from the Web to characterize songs.

Consider an example with two queries in the form of "title+lyrics" and "title+reviews", respectively. In this example, the first page returned by the first query and the top 20 pages returned by the second query can be used to generate descriptions. That is, these retrieved pages can be merged as a virtual document, for example, after removing HTML tags and stop words. Then, for each term in this virtual document, the well-known "term frequency-inverse document frequency (tf×idf)" can be computed as its weight (e.g., the idf can be estimated based on a Web-scale corpus). Next, the top N terms with the highest weights can be selected as a description for the song (see two queries). Various trials presented herein set N equal to 100, in an effort to keep the most informative terms and to balance computational complexity in further probability inference. Other numbers of "top" terms may be used.

Various techniques exist for processing of documents (e.g., Web documents), which may have some similarities. Various examples and trials presented herein focus on Weblogs where bloggers write about their feelings, opinions, and emotions. In various examples, for each blog post, the top 100 terms with the highest tf×idf can be kept as salient words for further inference.

Various exemplary techniques described herein offer opportunities for Web-based businesses. For example, existing systems may lose lots of chances for providing music recommendations when users surf the Web and, in turn, they may also lose potential music sales. An exemplary system based on an "emotion allocation" approach operates in an active mode to grasp a wide array of opportunities for music recommendations and optionally associated sales.

An exemplary system operates to deliver music recommendations matched to website content to increase the possibilities music and optionally associated sales (e.g., music, music books, videos, shirts, etc.). Such a system may automatically deliver music (or its thumbnail) which is relevant to the context of a Web page when users read it. Such a system can operate in an integrated manner with websites of forums or Weblogs such as WINDOWS LIVE SPACES® website services. WINDOWS LIVE SPACES® technology now supports users manually tagging their favorite songs as backgrounds of their blog posts, to show their personal tastes or feelings. Some readers may find interest in such background songs when reading the blogs, and they may want to know more information of these songs, or even buy them. In this way, such background songs can act as a special advertisement. Further, mechanisms may be implemented to support sales. Such a recommendation system can benefit many parties, for example, readers can obtain new songs, music manufactures can sell their products, and bloggers and WINDOWS LIVE SPACES® website services (or other service providers) can also share some revenue.

Various efforts have been reported on either music or text emotion classification. For example, a Gaussian mixture (GM) model was utilized to classify music songs into four emotion categories, using acoustic content features like intensity, timbre, and rhythm. For text documents, some studies exist for various supervised classifiers to classify online product reviews into positive and negative opinions. Some researchers have also tried to categorize Weblogs into a number of most frequently used moods with support vector machine (SVM). As described herein, however, these approaches have some limitations. First, they can handle only a few mood categories, which may be insufficient and inflexible. Second, they utilize supervised algorithms for mood classification, and their effectiveness thus relies heavily on the quality of training data. For various scenarios presented herein, it can be quite difficult to collect enough high quality training data for a reasonable number of possible emotions. Moreover, cross-modal emotion mapping is still an open problem.

As described herein, a particular system is referred to at times as MusicSense. The MusicSense system can operate to help users find out which songs are most suitable to an article where the songs are provided, for example, from a music collection of one or more music distributors (e.g., individual artists, companies, etc.). The MusicSense system operates to properly measure the context relevance between one or more music songs and, typically, a single Web page. As discussed in more detail below, the MusicSense system uses emotion as a bridge for relevance matching, as music is often about conveying a composer's emotions, and lots of Web pages such as Weblogs also express writer sentiment. As mentioned, an exemplary probabilistic modeling approach referred to as emotional allocation can characterize songs and Web pages as distributions in a common emotion space. Such an approach leverages both the statistics from a large-scale Web corpus and guidance from psychological studies, and can also keep the inference ability of generative probabilistic models. In operation, given an article, one or more songs with the closest emotion distributions to the article can be selected and presented to a user as contextual music advertisements.

As described herein, various exemplary techniques provide a contextual approach to music recommendation. When implemented as an exemplary system, such techniques can automatically suggest music when users read Web documents such as Weblogs. In such a contextual approach, the system matches music to a document's content, in terms of the emotions expressed by both the document and songs. As mentioned, a generative model (referred to as an emotional allocation model) considers a collection of word terms as having been generated with a mixture of emotions. This model can integrate knowledge discovering from a Web-scale corpus and guidance from psychological studies of emotion. Songs are also described using textual information extracted from their metadata and relevant Web pages. Thus, both music songs and Web documents can be characterized as distributions over the emotion mixtures through the emotional allocation modeling. For a given document, the songs with the most matched emotion distributions are can be selected and recommended.

Figure 1:
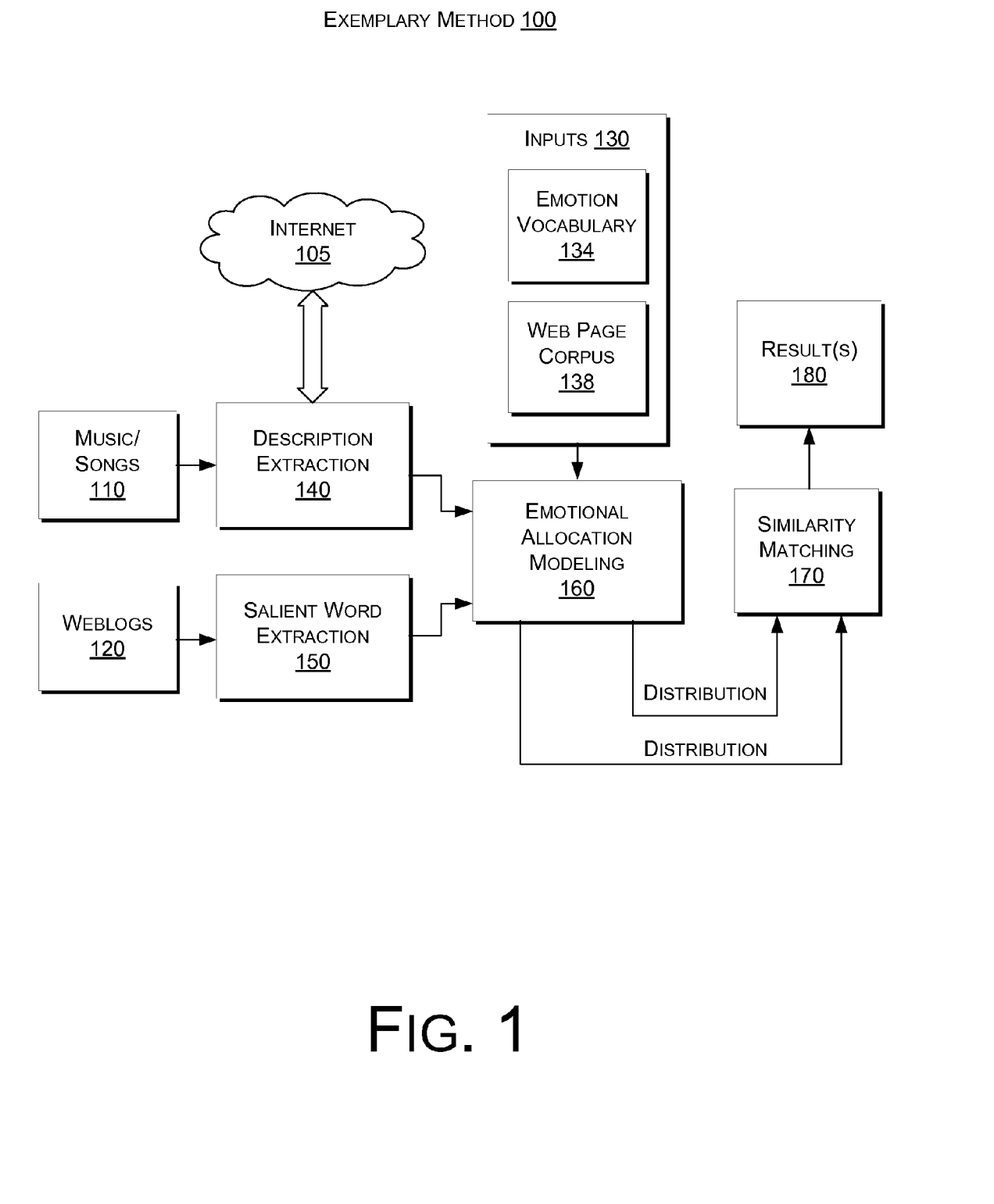
FIG. 1 is a diagram of an exemplary method for matching music and document information using an emotional allocation model.

FIG. 1 shows an exemplary method 100 for selecting music based on emotional allocation modeling and similarity matching. The method 100 includes a variety of inputs including music 110, weblogs 120 and model specific inputs 130. Based on these inputs, the method 100 outputs one or more results 180. For example, the method 100 can output one or more songs 180 as being recommended for play while a person reads one of an input weblog 120. Given inputs 110, 120 and 130, the method 100 can be divided into three main phases for outputting one or more results 180: (i) an extracting phase, (ii) a modeling phase and (iii) a matching phase.

In practice, a framework for performing the method 100 would normally define an emotional allocation model (e.g., based on a coding system and a corpus); perform Web-based music description extraction and Web document analysis; generate distributions using the model; and then perform similarity matching using, for example, probability inference and relevance matching. In turn, given a particular document, the framework can recommend one or more songs as matching the emotional context of the document.

As shown in the example of FIG. 1, the extracting phase includes an extraction block 140 for extracting descriptions for input music 110. The extraction block 140 may connect to the Internet 105 to locate relevant information, for example, based on one or more identifiers for the input music 110 (e.g., title, artist, composer, label, genre, etc.). Hence, the extraction block 140 relies on one or more identifiers for input music (e.g., metadata) to extract additional, relevant information from a rich information source (e.g., the Internet). The extraction phase also includes an extraction block 150 for extracting salient words and/or other content from input weblogs 120. In turn, the extraction blocks 140, 150 provide input to a modeling block 160 for the modeling phase of the method 100.

The modeling block 160 further receives model specific inputs 130, which for the example of FIG. 1 are in the form of emotion vocabulary 134 and a web page corpus 138. The modeling block 160 relies on the inputs 130 and information received from the extraction blocks 140, 150 to generate distributions. In a matching phase of the method 100, a matching block 170 matches characteristics of the generated distributions to output the one or more results 180 based on a matching criterion or criteria.

As described herein, an exemplary method includes an extracting phase that extracts information, a modeling phase that generates distributions based at least in part on the extracted information; and a matching phase that matches similarities between characteristics of the generated distributions. In the context of a document as input, an exemplary method includes extracting salient information about the document; generating distributions based at least in part on the extracted document information, information about a collection of songs, an emotion vocabulary and a document corpus; and matching similarities between characteristics of the generated distributions to identify one or more songs that can be output as a recommendation or recommendations. As described in some examples below, a recommended song or songs "match" the emotion of a document.

Figure 2:
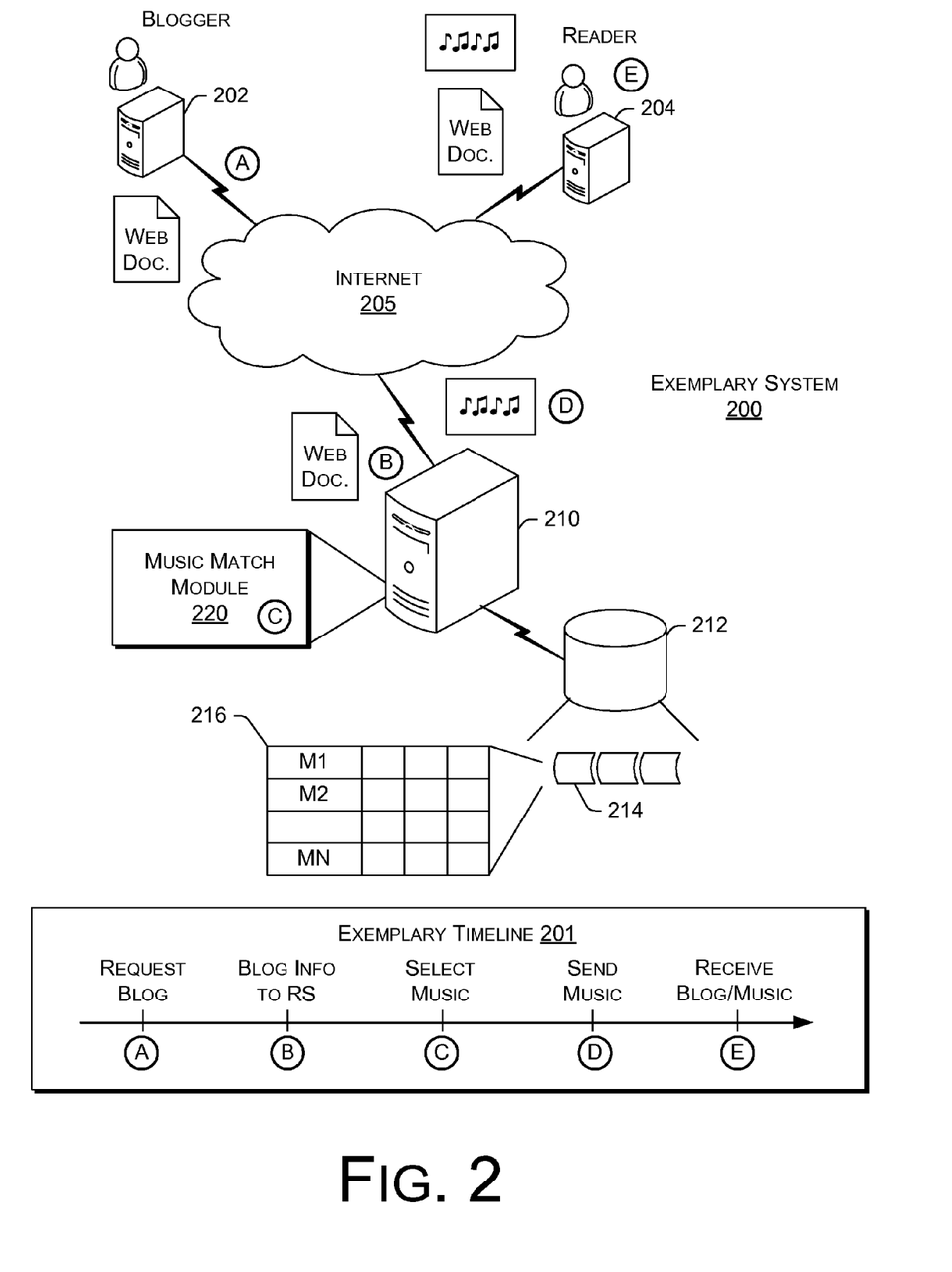
FIG. 2 is a diagram of an exemplary system and timeline for matching music to a web document.

FIG. 2 shows an exemplary system 200 and a timeline 201 as representative of an exemplary method. The system 200 includes a blogger with an associated computing device 202, a reader with an associated computing device 204, and a recommendation service with an associated computing device 210 where all of the computing devices 202, 204, 210 include network interfaces for communication via the Internet 205 (or other suitable network). The computing device 204 may include a module for a recommendation service, which may allow for implementing a user interface such as the graphical user interface 800 of FIG. 8.

The recommendation service computing device 210 includes a data store 212 for storing data 214 where the data may be organized in a database format 216. The device 210 further includes an instruction module 220, referred to in the example of FIG. 2 as a music match module. The module 220 may be in the form of computer-executable instructions for an emotional allocation model to generate distributions for documents and distributions for songs in a common emotional space and a Kullback-Leibler divergence algorithm to compare the generated distributions for documents and the generated distributions for songs.

According to the timeline 201, at time A, a reader requests a blog page, which is shown in the form of a Web document. In the example of FIG. 2, the blogger machine 202, the reader machine 204 or both may subscribe to the recommendation service of the machine 210. At time B, the blog page (i.e., blog information) is received by the recommendation service machine 210. In turn, at time C, the machine 210 relies on the module 220 to select some music (e.g., one or more songs) based at least in part on the blog information. The machine 210, at time D, then sends the music and/or information about the music to the reader machine 204. In the example of FIG. 2, the reader machine 204 receives the blog page and some selected music (e.g., at time E) where the music matches some emotional context of the blog page. The route for the blog page to the reader machine 204 may be via the machine 210, direct from the blogger machine 202 or via some other intermediate machine (e.g., a server).

Figure 3:
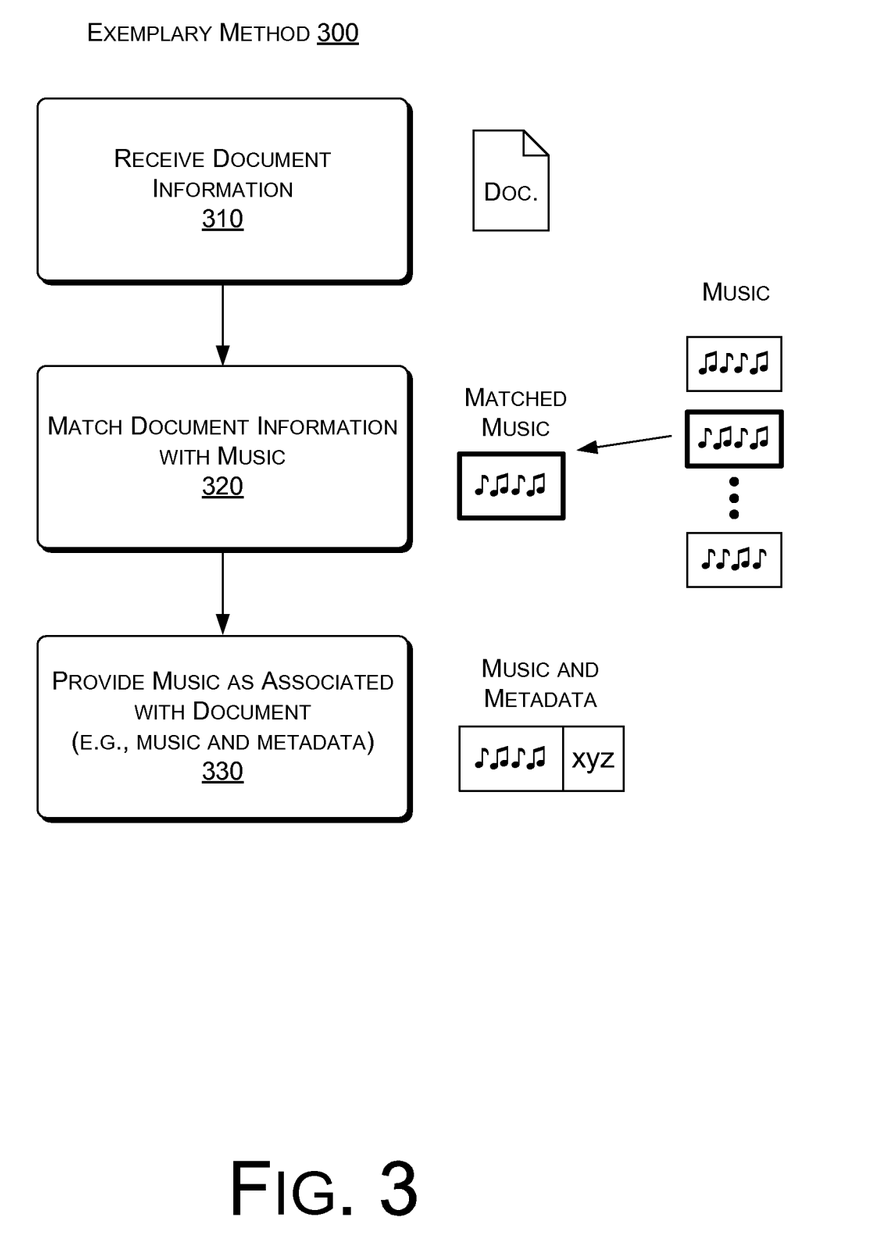
FIG. 3 is a diagram of an exemplary method for receiving information about a document, matching the information to music and providing the music as associated with the document (e.g., providing music information and some metadata for the document)

FIG. 3 shows a block diagram of an exemplary method 300. Such a method may be implemented by the computing device 210 of the system 200 of FIG. 2. For example, the module 220 may include instructions for performing one or more steps of the method 300.

In a reception block 310, a document or information about a document is received (i.e., document information). In a match block 320, the document information is matched with music, for example, a song selected from a collection of songs. In turn, a provision block 330 provides the music as associated with the document. As mentioned, a provision block may provide information about the music in association with the document. For example, the information about the music may be an advertisement and a control, URL, etc., to enable a reader of the document to buy or otherwise access the music. In other examples, the provision block 330 may provide a sample of the music (e.g., a segment of a song or a segment for each song in a group of songs). As shown in FIG. 3, the music is associated with metadata where the metadata includes information for associating the music with the document. For example, the metadata may be a URL or other information germane to the document.

As described herein, an exemplary method can be implemented at least in part by a computing device and include defining a vocabulary for emotions; extracting descriptions for songs; generating distributions for the songs in an emotion space based at least in part on the vocabulary and the extracted descriptions; extracting salient words from a document; generating a distribution for the document in an emotion space based at least in part on the vocabulary and the extracted salient words; and matching the distribution for the document to one or more of the distributions for the songs. In various examples, the emotion space of the distributions for the songs and the emotion space of the distribution for the document is a common emotion space. As discussed in more detail below, such a method can perform matching of distributions based at least in part on Kullback-Leibler divergence. In general, various methods can recommend one or more songs that include emotional characteristics that match emotional characteristics of a particular document.

As discussed herein, a method may include extracting salient words from a plurality of documents, generating distributions for a plurality of documents, and matching closest document-song pairs based on distributions for the documents and distributions for songs in a common emotion space. For example, a common emotion spaces may include more than approximately 10 emotions, which allows for mixed emotion mapping.

In various examples, a method can provide information for purchasing one or more songs. In various examples, a method can include comparing one or more songs to a personal collection of songs. In this latter instance, purchasing may not be required (noting that performers may differ, consider cover versions of popular songs or the many different versions of old and classical songs in the public domain).

While emotional allocation modeling has been mentioned in some detail, the description that follows provides an example with additional detail. In particular, the example is described with respect to model construction, parameter inference, and relevance matching.

Figure 4:
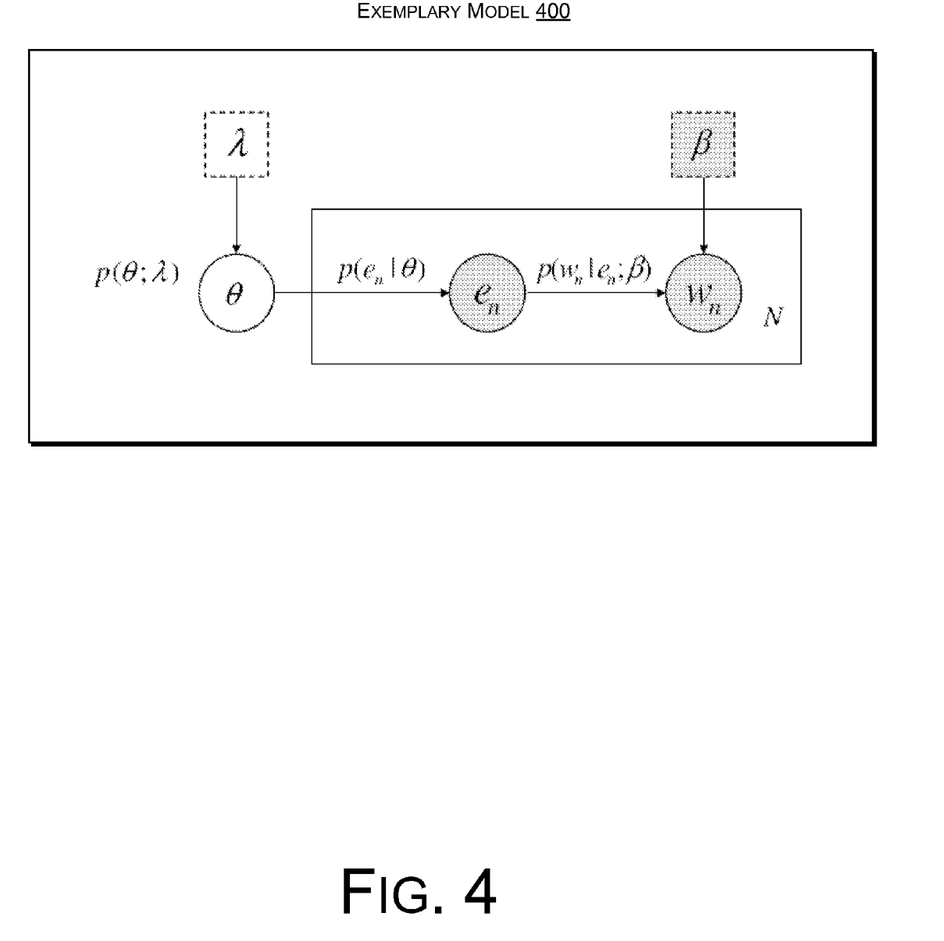
FIG. 4 is a diagram of an exemplary model and associated parameters.

FIG. 4 shows a graphical model 400 representation for emotional allocation a box denotes "plate" representing replicates and solid circles denote random variables while dash squares denote hyper-parameters.

In the model 400, it is assumed that there are K emotions, each of which can be represented as a multinomial distribution over all the terms from a vocabulary $W=\{w_1, \ldots, w_M\}$, as Equation 1:

$$p(w=w_m|e=e_k)=\beta_{km} \quad (1 \leq m \leq M, 1 \leq k \leq K)$$

Where for each k there is $\Sigma_{m=1}^{M} \beta_{km}=1$ as shown in FIG. 4. In other words, conditioned on an emotion $e_k$, each term $w_m$ can be generated with the probability $k_m$. In addition, to characterize the generation process of a series of terms, the emotion variable e is considered as continually sampled from another multinomial distribution $p(e=e_k|\theta)=\theta_k$, which is controlled by a hyper variable $\theta$. Similar with the assumption in the latent Dirichlet allocation (LDA), here it is also assumed that $\theta$ follows a Dirichlet distribution (as it is the conjugate prior of the multinomial distribution in Bayesian statistics). The probability density of a K-dimensional Dirichlet distribution is defined as Equation 2:

$$Dir(\theta; \lambda) = \frac{\Gamma\left(\sum_{i=1}^{K} \lambda_i\right)}{\prod_{i=1}^{K} \Gamma(\lambda_i)} \prod_{i=1}^{K} \theta_i^{\lambda_i - 1}$$

where $\lambda=(\lambda_1, \ldots, \lambda_K)$ is the parameter of this density. Thus, all the parameters of this model are $\lambda$ and $\beta$.

In this modeling approach, the K emotions $\{e_1, \ldots, e_K\}$ can be manually selected according to the suggestions from psychology studies. For example, there are forty basic emotions defined in the Basic English Emotion Vocabulary, which are also adopted for trials presented herein. In such a situation, it becomes very difficult to collect and appropriately label sufficient training data for learning the emotion-term relations (i.e., $\lambda$ and $\beta$). Thus, $\beta$ is estimated through stating a Web-scale corpus (around 100 million Web pages were used in trials). Here, the main assumption is, $k_m$ should be proportional to the co-occurrence frequency of the term $w_m$ and the emotion $e_k$, when the corpus is large enough.

An exemplary detailed implementation is as follows:

1. Expand each emotion with its synonyms looked up from the WordNet. For example, the emotion "happy" is expanded with words like blessed, blissful, glad, and so on. Such $M_k$ typical synonyms of the emotion $e_k$ are noted as $w_i^K$, $1 \leq i \leq M_k$ (for efficiency, $M_k$ was less than 10 in the trials).

2. For each pair $(w_m, w_i^K)$, state its co-occurrence $Nw_m, w_i^K$ on the whole corpus. Here, the two terms are considered to have one co-occurrence if they are in a same paragraph. This is because a paragraph is a block with relatively consistent semantics and proper length; while a sentence can be too short to provide sufficient statistics, and a whole document can be too long and may contain multiple semantics.

3. Define the co-occurrence of the term $w_m$ and emotion $e_k$ as:

$$N_{w_m,e_k} = \Sigma_{i=1}^{M_k} N_{w_m,w_i^k} \times idf_{w_m} \times idf_{w_i^k}$$

where $idf\_w_m$ and $idf\_w_i^k$ are inverse document frequencies estimated on the same corpus, and are used here to punish those popular terms.

4. $\beta_{km} = N_{w_m,e_k}/\Sigma_{i=1}^{M} N_{w_i,e_k}$

As introduced above, the goal of the modeling is to predict the essential emotion allocation of a set of terms, which is controlled by the variable $\theta$ in this model. From the graph structure in FIG. 4, the conditional probability of a collection of N terms $w=<w_1, \ldots, w_N>$ given $\theta$ is as Equation 3:

$$p(w|\theta; \lambda, \beta) = \prod_{n=1}^{N} \sum_{e_n=1}^{K} p(w_n|e_n; \beta) p(e_n|\theta; \lambda)$$

Contrarily, with Bayes' theorem, the posterior distribution of $\theta$ given the collection w is Equation 4:

$$p(\theta|w; \lambda, \beta) = \frac{p(w|\theta; \lambda, \beta)p(\theta; \lambda)}{\int_\theta p(w|\theta; \lambda, \beta)p(\theta; \lambda)d\theta}$$

which is unfortunately computationally intractable. However, the variational inference can provide a close approximation to the model parameters, denoted as $\lambda^*$, in an iterative process shown in FIG. 5 as Table 1.

Figure 5:
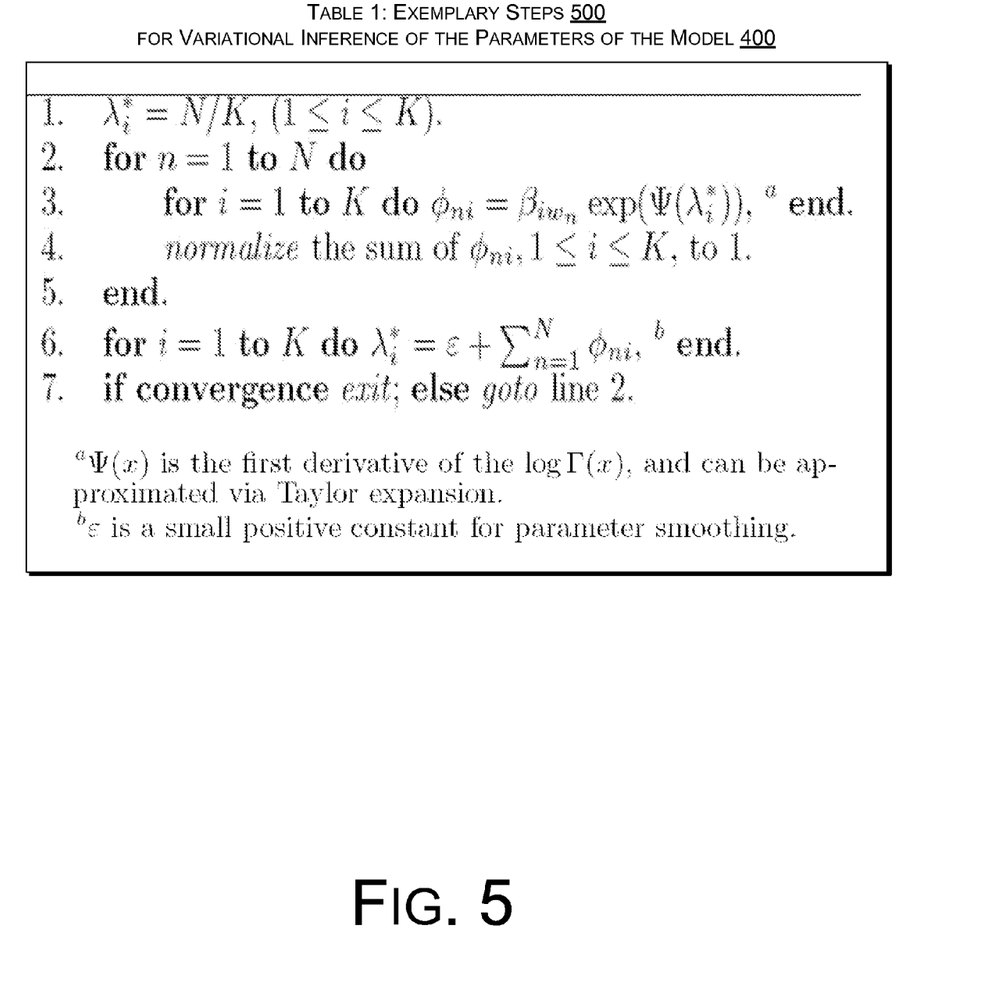
FIG. 5 is a table listing exemplary steps for variational inference of parameters of the model of FIG. 4.

In the first step in Table 1, $\lambda^*$ is by default uniformly initialized, assuming each mood has equal prior probability on this word collection. However, as mentioned above, $\lambda^*$ can also be particularly initialized if other knowledge like the results of acoustic analysis is available, to achieve a more reasonable inference result. For example, if a song is classified as sad with content-based analysis, the corresponding element in $\lambda^*$ could be initialized with a higher prior weight.

Through the inference, each term collection is finally represented as a Dirichlet distribution over the mixture of emotions, with the optimized posterior parameter $\lambda^*$.

With respect to relevance modeling, two term collections are considered to be relevant if they have similar distributions, i.e., similar allocations of emotions. In a so-called Music-Sense example, songs most relevant to a Weblog should be selected as its recommendations.

The most natural way to measure the similarity of two distributions is the Kullback-Leibler divergence (KLD or KL divergence). The KL divergence of two K-dimensional Dirichlet distributions $Dir(\theta;\lambda^p)$ and $Dir(\theta;\lambda^q)$ is Equation 5:

$$KL_{Dir}(\lambda^p; \lambda^q) =$$

$$\log\frac{\Gamma\left(\sum_{i=1}^{K} \lambda_i^p\right)}{\Gamma\left(\sum_{i=1}^{K} \lambda_i^q\right)} + \sum_{i=1}^{K} \log\frac{\Gamma(\lambda_i^q)}{\Gamma(\lambda_i^p)} + \sum_{i=1}^{K} [\lambda_i^p - \lambda_i^q]\left[\Psi(\lambda_i^p) - \Psi\left(\sum_{j=1}^{K} \lambda_i^p\right)\right];$$

As the KL divergence is asymmetry, the distance between two term collections $w_p$ and $w_q$ is finally defined as Equation 6:

$$Dist(w_p; w_q) = \frac{1}{2}(KL_{Dir}(\lambda^p; \lambda^q) + KL_{Dir}(\lambda^q; \lambda^p))$$

where small distance means high relevance.

Evaluation of music recommendation is not a trivial task. In various trials, recommendation results were compared with subjective preference, to find out how close the approach can reach an ideal system.

In the trials, 100 songs and 50 Weblogs were collected. These songs and Weblogs were selected from various themes, and aimed to cover as many emotions as possible. The descriptions of all the songs were retrieved from the Web. Five subjects were then invited to label the ground truth, includes:

Each labeler was asked to listen each song and then tag it with one or more words from the forty emotions in the Basic English Emotion Vocabulary. The Weblog posts were also tagged in the same way.

For each Weblog, each labeler was asked to find out 3~5 songs, which are the most ideal candidates in his (her) mind for listening when reading that blog post, from all the 100 songs.

Figure 6:
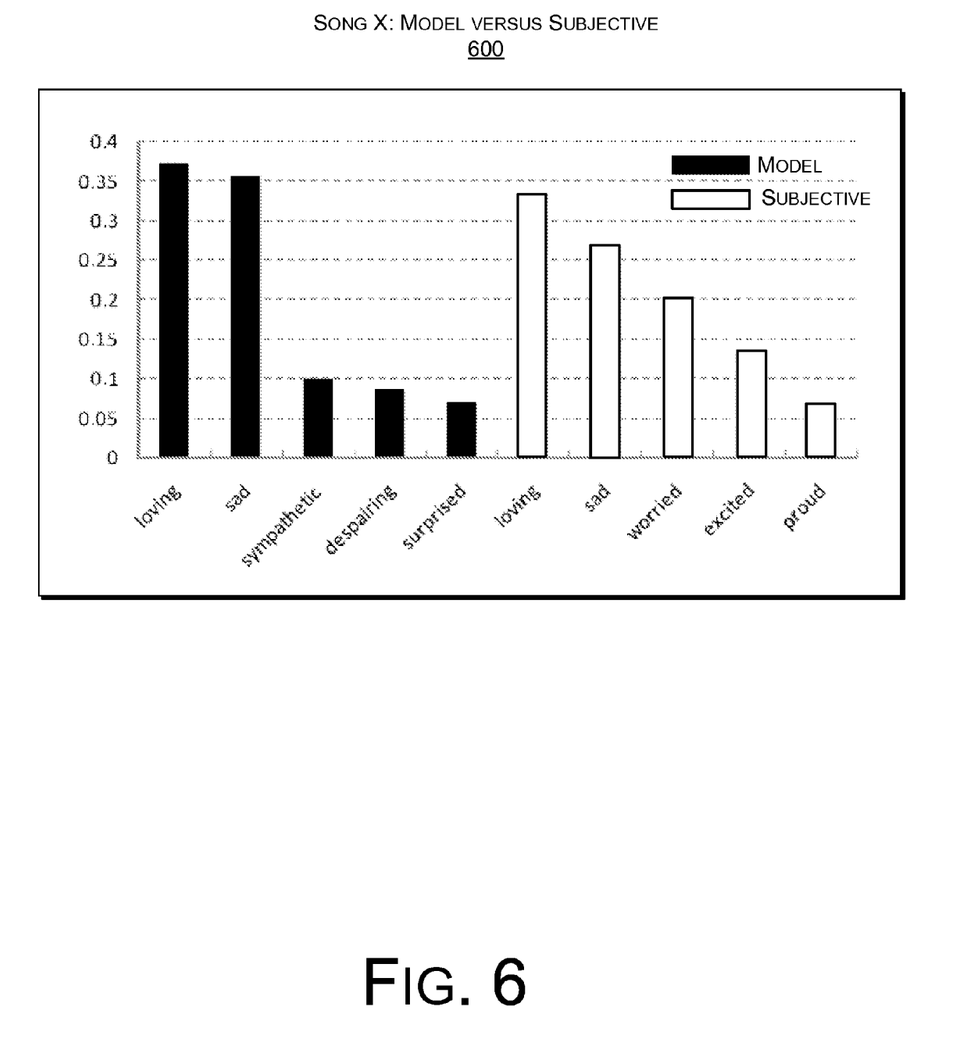
FIG. 6 is a plot of model emotion and subjective emotion for a song.

Accordingly, the following evaluations consist of two parts: (i) emotion allocation and (ii) music recommendation. As to effectiveness of the proposed modeling on music emotion allocation, each song is represented with a Dirichlet distribution parameterized by $\lambda^*$. According to the properties of a Dirichlet distribution, there is $$E(\theta_i|\lambda^*) = \lambda_i^*/\Sigma_{k=1}^{K}\lambda_k^*$$

which can be taken as the "weight" of the $i^{th}$ emotion in this song. For manually labeling, such a weight for each emotion on each song can be approximated through averaging the tag counts of all the labeler. FIG. 6 shows a plot 600 of model versus subjective results for the famous song "My Heart Will Go On".

From FIG. 6, it is still satisfied that the trial result is agreed with the ground truth on the first two major emotions: loving and sad; and the weights on these two emotions are also close. Moreover, the rest three emotions estimated using the model are also somewhat related to the song's semantics. Further measurements of the correlation coefficient between the two weight vectors generated by the model approach and human labeling, reached around 0.71 on this song. The average correlation coefficient over the whole 100 songs is about 0.48. The evaluation of emotion allocation of blogs was carried out in the same way, and the average correlation coefficient was about 0.42. These results indicate that for emotion allocation, there does exist a positive correlation between the model approach results and the ground truth.

Figure 7:
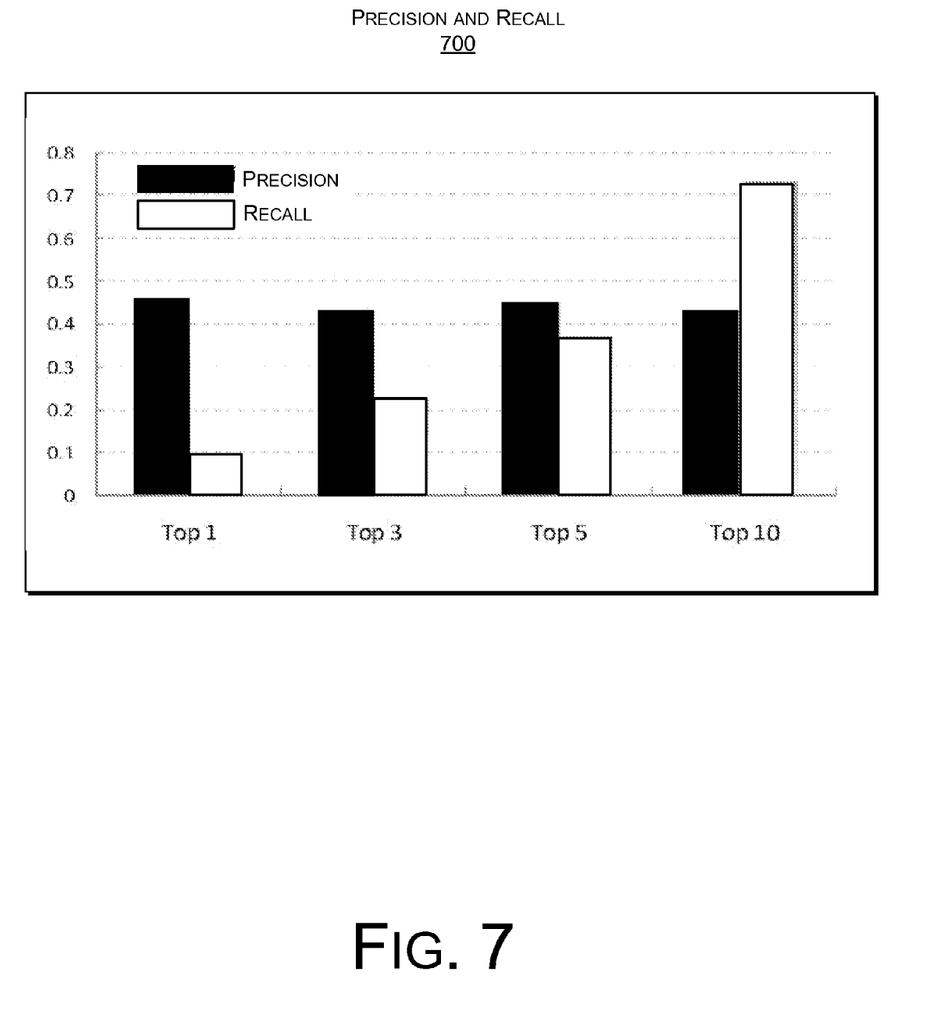
FIG. 7 is a plot of precision and recall where for each blog post and a given N, the recall and precision are defined as recall=$N_c/N_s$ and precision=$N_c/N$.

To evaluate the recommendation performance, for each blog post, the suggestions from all the labelers as the ground truth were merged. On average, there were around 5.75 such suggestions for each post. Here, the labeling consensus is somewhat large because of the small scale of the music collection in the trials. Then, the distances between all the songs and blog posts were computed and sorted in ascending order for each post. The algorithm was very efficient in practice, i.e., the computational time was less than one second to go through the whole 100 songs using a PC with 3.2 GHz Intel Pentium 4 CPU and 1 GB memory. At last, those top N ranked songs were selected as recommendations, and the average recalls and precisions over all the blogs are shown in a plot 700 of FIG. 7, for N=1, 3, 5, 10, respectively.

For each blog post and a given N, the recall and precision are defined as recall=$N_c/N_s$ and precision=$N_c/N$. Here, $N_c$ is how many songs from the subjective suggestions have been covered in the top N candidates ranked by the exemplary approach; and $N_s$ is the total number of subjective suggestions for that blog. From FIG. 7 it is notable that, when N increases, the precisions are relatively stable at around 45%, while the recalls increase from below 10% (N=1) to above 70% (N=10). This indicates that, about half of the candidates recommend by the exemplary approach in the trials are consistent with the subjective opinions; and when N becomes large enough, most preferred songs can be retrieved within the scope of the modeling approach.

As described herein, various techniques for contextual music recommendation allow for matching music with context extracted from a document or otherwise associated with a document. An exemplary technique uses a probabilistic model referred to as an emotional allocation model. With such a model, trials demonstrated that one could reasonably consider each song (or a Weblog) as generated with a distribution over a mixture of emotions, effectively integrate knowledge discovering from a Web-scale corpus and guidance from psychological studies, and also keep the inference ability of a generative model. In such a manner, emotion acts as a bridge for relevance matching between blogs and songs. Again, trials indicate that the model operates effectively; both the emotion estimation and the music recommendation match subjective preference closely.

While various examples discuss emotion, emotion may be used in conjunction with one or more other measures to determine relevance between music and documents. As mentioned, recommendations may be presented via a graphical or other user interface (e.g., audio alone, audio with graphics, graphics alone, etc.) where a user may be provided one or more controls to buy, download, listen, mark as a favorite, etc., one or more recommended songs. Further, feedback may be acquired for a user, for example, where a "favorites" library is generated. Such a library may be configured to store "subjective" information provided by a user, which, in turn, may be collected from time-to-time by a recommendation service to improve a model for that user and/or for multiple users.

Figure 8:
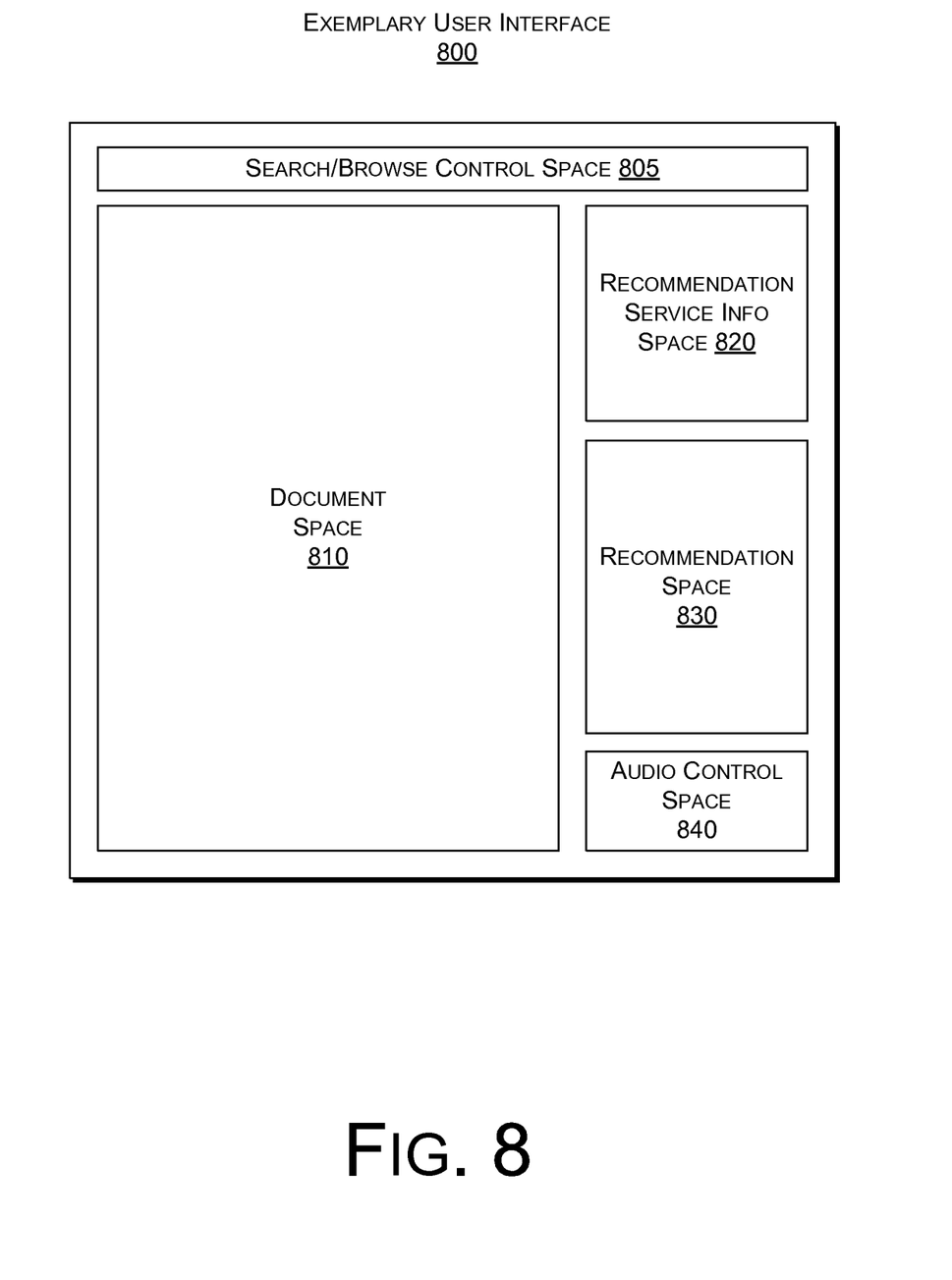
FIG. 8 is a block diagram of an graphical user interface (GUI) for use with a recommendation service.

FIG. 8 shows an exemplary graphical user interface (GUI) 800 for use in conjunction with a recommendation service such as a service provided by the module 220 of FIG. 2. In the example of FIG. 8, the GUI 800 includes a search/browse control space 805 for various features that allow a user to access a website and/or search for a website or websites based on a search criterion or search criteria. Further, the space 805 may include favorites for easy access to favorite websites. The GUI 800 also includes a document space 810 for presentation of a document. A document may be a text document, a picture, a video, etc. The document may be retrieved from the Web or from a data store (e.g., locally saved document). The GUI 800 also includes a space 820 for information germane to a recommendation service. Such a space may include one or more controls to turn on or off the service. Such a space may also provide any of a variety of advertisements, whether related to the document or not. The GUI 800 further includes a recommendation space 830 for recommendations related to the document displayed in the document space 810. As discussed herein, a user may access a document via a network and then, via a recommendation service, read the document while listening to music recommended and optionally provided by the recommendation service. In the example of FIG. 8, an audio control space 840 is also shown for audio controls (e.g., play, rewind, forward, volume, color scheme, groovy graphics, etc.). For example, the GUI 800 may include colors or graphics that change with aspects of the music being played.

While the examples discussed herein generally pertain to some external collection of music, a user may have a personal library or subscription library where matching occurs between a model library (i.e., model collection) and a personal collection. For example, if the recommendation service recommends the song "I Love Rock and Roll", the service may include an option of searching the personal library of the user for that song. In turn, the service may alert or immediately activate a player to play the song from the user's library.

While some examples are shown or described with respect to the English language, exemplary techniques may be applied in other languages or cross-language. Further, a system may include one or more translation modules to provide for translations from text in one language to song matching in another language or culture. For example, consider an English blog about Spain. A recommendation service may provide a control that allows a reader to select a Spanish music collection for recommendations where salient emotion queues are extracted from the English blog.

Various techniques statistically use emotion to bridge other information (e.g., text and song). As described herein, various techniques can expand a list of words for an emotion (see, e.g., FIG. 6), for example, using a thesaurus (e.g., to provide synonyms). Words may also be weighted as being associated with a single emotion or multiple emotions, optionally in varying degrees. As already mentioned, the concept of punishment may be used (e.g., negative weighting).

In various examples, the concept of mixed emotions was presented. For example, a document may be 6% happy, 30% surprising and 35% exciting. A document may be classified in an emotional space with multiple dimensions. Further, the concept of mapping music to an emotional space may be used. For a given music piece, a recommendation service may use the title, lyric or reviews for emotional space mapping. Such information may be collected from the Internet using a search engine. For example, a search on "Beethoven Op. 49, No. 1" returns notes that state:

"Beethoven's 'Hammerklavier' Sonata has everything it needs to succeed: propulsive intensity in the enormous opening Allegro, mercurial vivacity in the teensy-tiny Scherzo, concentrated spirituality in the immense Adagio sostenuto, and titanic muscularity in the closing Allegro risoluto".

Hence, reviews and notes can be a rich source of emotional terms for use in a recommendation service, particularly for using words to map music to an emotional space or to map a particular musical recording to an emotional space. For the latter, it may be appreciated that a 10 year old performer of Beethoven may be expected to provide a different emotional interpretation than a grand master performer of age 50 years or more.

As mentioned, a web document may be any type of document. For example, a web document may be text, a picture with associated text, a video with associated text. Further, a recommendation may be more than a music recommendation. For example, a recommendation service may provide a movie recommendation, a book recommendation, etc., where the recommendation is based at least in part on emotion.

As described herein, a service may be turned on or off. For example, a user may be presented with an option setting for activating background music. In general, the time introduced by a recommendation service is not significant. For example, upon accessing a blog, the user receives a recommendation within seconds. As mentioned, a user may control aspects of a library or emotional space. For example, a user may select filters that limit the library to certain artists, composer, genres, cultures, emotions, etc.

As mentioned, a recommendation service may operate to generate revenue and/or allow for revenue sharing. A blogger, an advertiser, or other web site owner/operator may participate in a system where a collection of music is limited to a musician, recording company, etc., and where sales of music from the collection generate revenue for some amount of sharing with the blogger, advertiser, or other web site owner/operator. For example, if someone clicks the recommended background music and buys it, the revenue can be shared.

In another example, a person or entity may pay to put music in library that will be used for recommendations. Such an example may be considered a front loaded model where the recommendation service collects money up front. In turn, the recommendation service may receive no revenue from sales or may operate according to a mixed model that includes up front money and some additional revenue from sales.

In yet another example, a recommendation service presents one or more recommendations to a user and a link. If the user clicks on the link, a space opens for display of additional information. For example, the link may be to a major record company where yet additional songs from an artist or collection are recommended and optionally available for purchase.

Exemplary Computing Device

Figure 9:
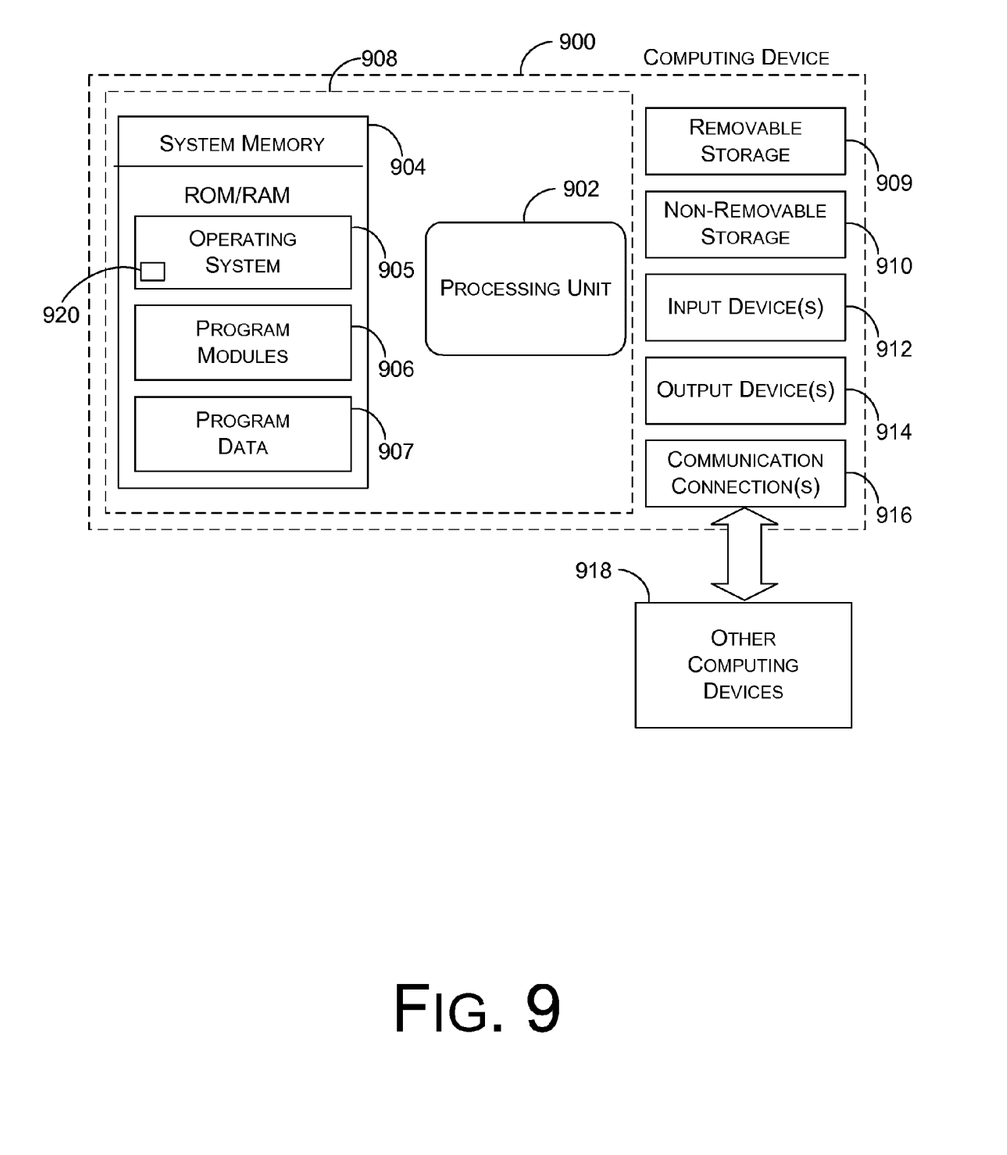
FIG. 9 is a block diagram of an exemplary computing device.

FIG. 9 illustrates an exemplary computing device 900 that may be used to implement various exemplary components and in forming an exemplary system. For example, the computing devices of the system of FIG. 2 may include various features of the device 900.

As shown in FIG. 2, the exemplary computing device 210 may be a server or other service provider machine and include a network interface; one or more processors; memory; and instructions stored in memory to generate distributions for documents and distributions for songs in a common emotional space, to match a generated distribution for a document to at least one generated distribution for a song, and to output, via the network interface, at least some information about a song that has a distribution that matches a distribution of a document. Such a device may also include instructions stored in memory to receive a document via the network interface. Such a computing device may include instructions stored in memory to distribute revenue from sales of the song that has a distribution that matches a distribution of a document.

In a very basic configuration, computing device 900 typically includes at least one processing unit 902 and system memory 904. Depending on the exact configuration and type of computing device, system memory 904 may be volatile (such as RAM), non-volatile (such as ROM, flash memory, etc.) or some combination of the two. System memory 904 typically includes an operating system 905, one or more program modules 906, and may include program data 907. The operating system 905 include a component-based framework 920 that supports components (including properties and events), objects, inheritance, polymorphism, reflection, and provides an object-oriented component-based application programming interface (API), such as that of the .NET™ Framework manufactured by Microsoft Corporation, Redmond, Wash. The device 900 is of a very basic configuration demarcated by a dashed line 908. Again, a terminal may have fewer components but will interact with a computing device that may have such a basic configuration.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by removable storage 909 and non-removable storage 910. Computer storage media may include volatile and nonvolatile, removable and non-removable media implemented in any method or technology for storage of information, such as computer readable instructions, data structures, program modules, or other data. System memory 904, removable storage 909 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 900. Computing device 900 may also have input device(s) 912 such as keyboard, mouse, pen, voice input device, touch input device, etc. Output device(s) 914 such as a display, speakers, printer, etc. may also be included. These devices are well known in the art and need not be discussed at length here.

Computing device 900 may also contain communication connections 916 that allow the device to communicate with other computing devices 918, such as over a network (e.g., consider the aforementioned network 205 of FIG. 2). Communication connections 916 are one example of communication media. Communication media may typically be embodied by computer readable instructions, data structures, program modules, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, implemented at least in part by a computing device, comprising:
    defining a vocabulary for emotions;
    extracting descriptions for one or more songs from web-based information that describes the one or more songs;
    generating one or more first distributions for the one or more songs in an emotion space based at least in part on the vocabulary and the extracted descriptions;
    extracting one or more salient words from a document;
    generating a second distribution for the document in the emotion space based at least in part on the vocabulary and the extracted salient words; and
    at the computing device, comparing the second distribution for the document to at least one of the first distributions for the one or more songs to provide at least one song recommendation corresponding to the second distribution for the document in the emotion space.

2. The method of claim 1 wherein the emotion space includes at least a minimum number of emotions to allow for mixed emotion mapping.

3. The method of claim 1 wherein the comparing comprises matching the first and second distributions based at least in part on Kullback-Leibler divergence.

4. The method of claim 1 wherein the comparing includes matching one or more closest document-song pairs.

5. The method of claim 1 wherein extracting descriptions for songs includes searching the Internet for the web-based information.

6. The method of claim 5 wherein searching the Internet is based at least in part on song titles for the one or more songs.

7. The method of claim 1 wherein the emotion space includes more than 10 emotions.

8. The method of claim 1 further comprising providing via a network an identification of the one or more songs that most closely matched the second distribution for the document.

9. The method of claim 8 further comprising providing information for purchasing the one or more songs.

10. The method of claim 1 further comprising comparing the one or more songs to a personal collection of songs.

11. The method of claim 1 wherein the document comprises a web document.

12. The method of claim 11 wherein the web document comprises a weblog.

13. The method of claim 1 wherein the one or more songs comprise emotional characteristics that match emotional characteristics of the document.

14. One or more computer-readable storage devices comprising computer-executable instructions which, when executed by at least one processor, instruct the at least one processor to perform actions comprising:
    by the at least one processor, providing an emotional allocation model to generate distributions for documents and distributions for songs in a common emotional space, the distributions for songs based on web-based information associated with the songs;
    by the at least one processor, employing a Kullback-Leibler divergence algorithm to compare the generated distributions for documents and the generated distributions for songs; and
    by the at least one processor, providing at least one song recommendation corresponding to the distributions for the documents in the common emotional space.

15. The one or more computer-readable storage devices of claim 14, wherein the actions further comprise:
    extracting salient words from the documents; and
    generating the distributions for the documents based on the extracted salient words.

16. The one or more computer-readable storage devices of claim 14, wherein the actions further comprise extracting descriptions for the songs from the web-based information.

17. A server comprising the one or more computer-readable storage devices of claim 14.

18. A computing device comprising:
    a network interface;
    one or more processors;
    a memory; and
    instructions stored in the memory and executed by the one or more processors to instruct the one or more processors to:
        generate distributions for documents and distributions for songs in a common emotional space, wherein the distributions for the songs are based at least in part on web-based information associated with songs;
        match a generated distribution for a document to at least one generated distribution for a song; and
        output via the network interface information about a song that has a distribution that matches a distribution of a document.

19. The computing device of claim 18, wherein the instructions further instruct the one or more processors to receive a document via the network interface.

20. The computing device of claim 18, wherein the instructions further instruct the one or more processors to distribute revenue from sales of the song that has a distribution that matches a distribution of a document.

* * * * *